United States Patent

[11] 3,574,997

| [72] | Inventor | Gerald H. Syrovy<br>1321 Georgina Ave., Santa Monica, Calif. 90402 |
|---|---|---|
| [21] | Appl. No. | 810,453 |
| [22] | Filed | Mar. 26, 1969 |
| [45] | Patented | Apr. 13, 1971 |

[54] HIGH PRESSURE HOT GAS GENERATOR FOR TURBINES
2 Claims, 4 Drawing Figs.

[52] U.S. Cl................................................. 60/13,
60/248, 123/47, 123/58, 123/73
[51] Int. Cl...................................................F02b 37/04,
F02k 5/02
[50] Field of Search........................................ 60/13, 13
(F), 226, 247, 248, 262; 123/(Inquired), 47 (A),
58 (A2), 58 (B2), 62, 71, 73 (F1), 73 (AA1), 119
(C), 74, 74 (B)

[56] References Cited
UNITED STATES PATENTS

| 942,782 | 12/1909 | Jones............................ | 123/73 |
|---|---|---|---|
| 1,670,355 | 5/1928 | Harris........................... | 123/58 |
| 2,403,282 | 7/1946 | Holmes......................... | 123/58 |
| 2,503,152 | 4/1950 | Ekblom......................... | 123/62 |
| 2,565,272 | 8/1951 | Sherman....................... | 60/13 |
| 2,590,457 | 3/1952 | Pouit............................ | 60/13 |
| 2,765,616 | 10/1956 | Cockerell..................... | 60/13 |
| 2,982,271 | 5/1961 | Heintz.......................... | 123/62 |
| 3,101,621 | 8/1963 | Bunyan......................... | 123/58 |
| 3,356,080 | 12/1967 | Howard......................... | 123/74 |

FOREIGN PATENTS

| 519,806 | 4/1940 | Great Britain............... | 60/13 |
|---|---|---|---|
| 734,359 | 7/1955 | Great Britain............... | 60/13 |

*Primary Examiner*—Douglas Hart
*Attorney*—Pastoriza & Kelly

ABSTRACT: A constant displacement air compressor is combined with a reciprocating type combustion chamber utilizing a modified diesel cycle process in such a manner that substantially all of the power developed by the reciprocating combustion chamber is employed to drive the air compressor. The air compressor in turn provides scavenging air to displace the combusted gases in the reciprocating combustion chamber, the scavenged air and gases constituting extremely high-pressure hot gas. This generated gas may then be directed to drive a turbine, power from the system for external work being derived from the turbine.

This invention relates generally to power plants for both mobile including aircraft and boats and stationary use and more particularly to a high-pressure hot gas generator for driving turbines.

INVENTOR.
GERALD H. SYROVY

Patented April 13, 1971

INVENTOR.
GERALD H. SYROVY
BY
Elliott E. Pastoriza
ATTORNEYS

HIGH PRESSURE HOT GAS GENERATOR FOR TURBINES

BACKGROUND OF THE INVENTION

Conventional turbine engines employ an air compressor unit of the centrifugal or axial flow type which is driven directly from the turbine itself. Efficient operation depends on the provision of very high-pressure gases for expansion through the turbine blades and such high-pressure gases can only be realized when the turbine is operating near maximum speed since the rotary air compressor unit itself is driven by the turbine. Even when operating near optimum conditions, the effective pressure ratios for large gas turbines may be only 20 to 30 to 1 at best. Moreover, idling economy for such turbines is relatively poor because of the inability to provide a wide range of speed modulation.

As a consequence of the foregoing, conventional turbine engines have not been really feasible for use in small engine applications such as automobiles, aircraft, boats, or other environments wherein wide speed variation is desirable and compactness and efficiency are important considerations.

BRIEF DESCRIPTION OF THE PRESENT INVENTION

With the foregoing in mind, a primary object of the present invention is to provide a novel power plant system utilizing a turbine wherein high-pressure gases for driving the turbine are derived by means other than a compressor unit driven by the turbine itself all to the end that the aforementioned difficulties with respect to efficient operation and idling control associated with conventional turbines are overcome.

More particularly, it is an object to provide a system for driving a gas turbine engine wherein substantially higher effective pressure ratios are derived in the turbine cycle with a result that greater thermal efficiency is realized and wherein the supply of high-pressure gas is such that a wide range of speed modulation is realizable so that economical idling conditions exist.

Briefly, the system contemplates combining the high efficiency feature of a diesel engine cycle with the compactness and light weight of a gas turbine. Towards this end, there is provided a constant displacement air compressor means coupled to a reciprocating-type combustion chamber means in a balanced manner such that substantially all of the power developed by the combustion chamber means drives the air compressor. Suitable conduit and valve means connect the outlet of the air compressor means to the air inlet of the combustion cylinder of the chamber means for mixing with fuel, the exhaust of combusted fuel and air constituting high-pressure hot gas for driving the turbine.

In one embodiment of the invention the piston for the combustion cylinder is directly mechanically coupled to the piston for the compressor through a crankshaft such that the air compressor piston operates 180° out of phase with the combustion piston. Essentially, the combustion cylinder is scavenged and supercharged with an excess of extremely high-pressure air with the result that very complete burning takes place in the combustion process, the high-pressure air from the air compressor scavenging the hot gases without appreciable loss of pressure through a suitable exhaust line which can channel these gases to drive a turbine.

In a second embodiment, the constant displacement air compressor piston is axially aligned with the combustion piston on a common interconnecting rod for simultaneous movement along a given axis. At least four such air pistons and associated combustion pistons are provided, two of the four being in opposed relationship along the given axis and another two being in opposed relationship along another axis laterally spaced from and parallel to the first mentioned given axis. A shaft is provided between the opposed piston arrangements and includes a wobble spider causing the opposed pistons to operate 180° out of phase with each other. This design renders the engine extremely compact and light and is particularly desirable for aircraft use.

In all of the embodiments, the compressor-combustion system provides a means of attaining effective pressure ratios in excess of 100 to 1 in a very small size gas turbine thus assuring extremely high thermal efficiency for the turbine engine operation. Moreover, there is a very complete combustion involved in the generation of these gases because excess quantities of the very high supercharging air from the air compressor are used in the scavenging process and combustion takes place with a lean fuel to air ratio. As a result, the overall operation is very clean and there is substantially no production of unburned gases such as cause smog and the like.

Finally, because of the unique manner of providing the hot gases for the turbine, wide speed modulation is possible and idling conditions can be realized very economically.

BRIEF DESCRIPTION OF THE DRAWINGS

A better understanding of the invention will be had by now referring to the accompanying drawings, in which.

Figure 3:
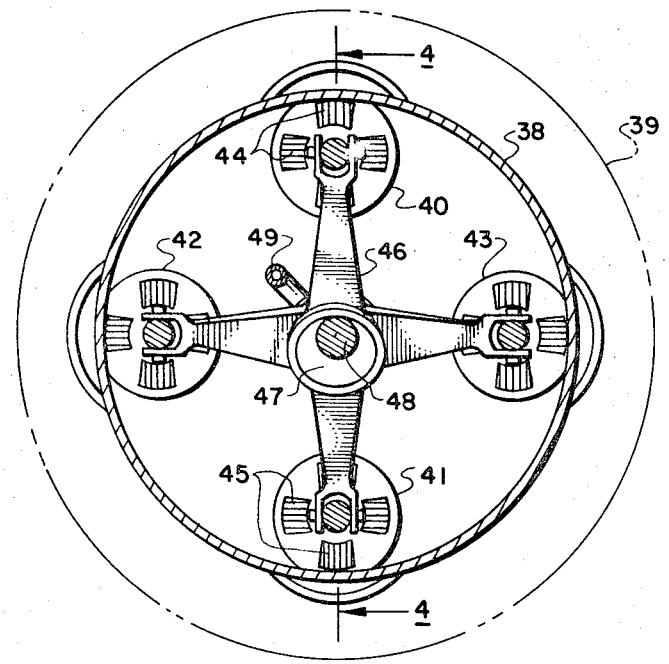
FIG. 3 is a highly diagrammatic cross-sectional end view of a second embodiment of the invention useful in aircraft.
Figure 4:
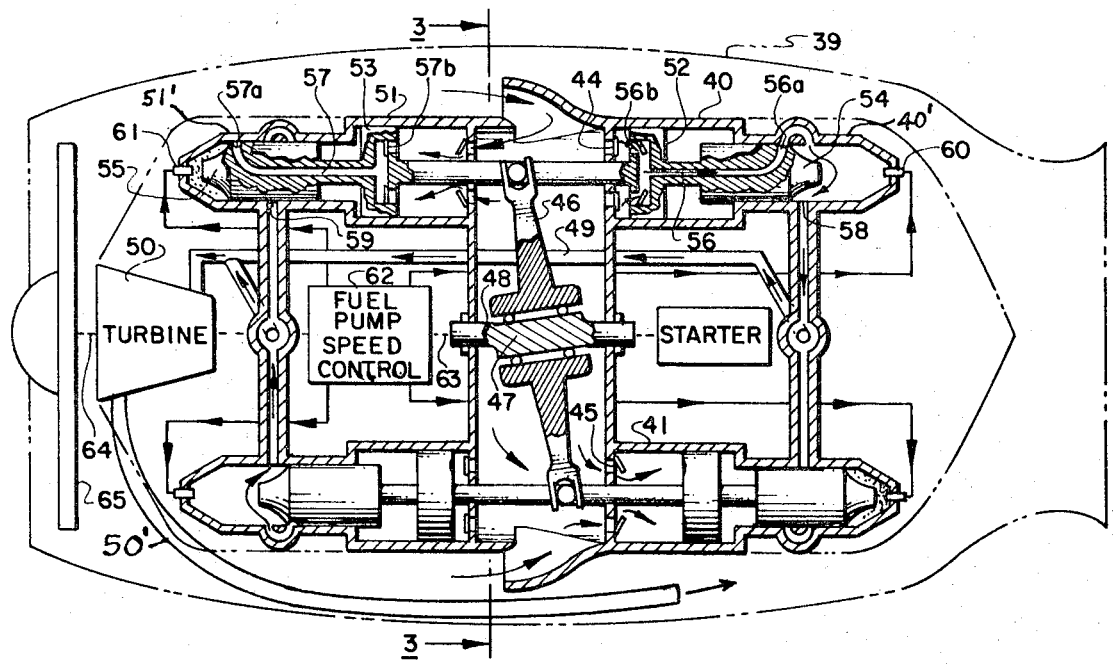
FIG. 4 is a highly diagrammatic side view partially in cross section and partially in full lines of the system of FIG. 3.

The cross section of FIG. 3 is taken generally in the direction of the arrows 3-3 of FIG. 4 and the cross section of FIG. 4 is taken essentially in the direction of the arrows 4-4 of FIG. 3.

DETAILED DESCRIPTION OF THE EMBODIMENT OF FIGS. 1 AND 2

Figure 1:
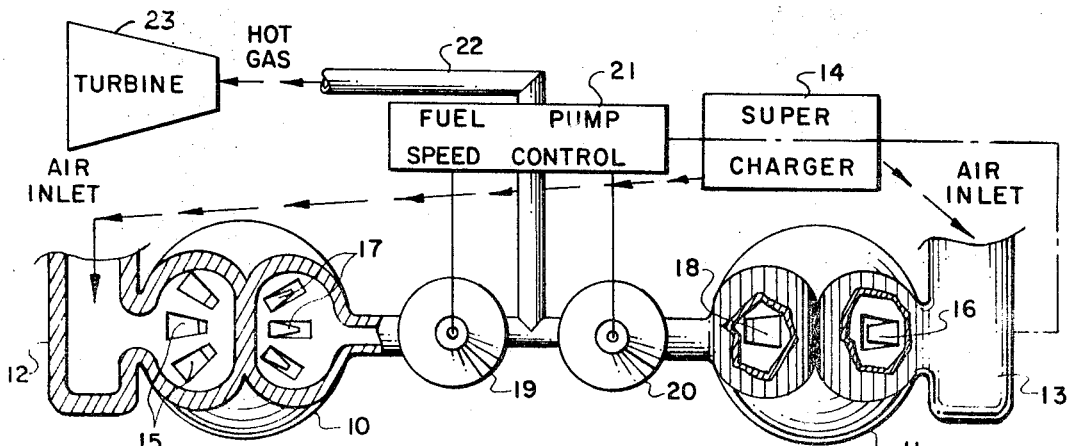
FIG. 1 is a highly diagrammatic top plan view partly broken away of a first embodiment of the high-pressure hot gas generator and turbine of this invention.

Referring first to FIG. 1 there is diagrammatically illustrated air compressor means in the form of air cylinders 10 and 11 provided with air inlet receiving chambers 12 and 13 respectively. Preferably, although not essential, a supercharger 14 in the form of a simple centrifugal-type may be provided for supercharging air passed into the chambers 12 and 13.

As illustrated in the broken away portions of the upper ends of the air compressor cylinders 10 and 11, there are provided pressure responsive inlet valve means 15 and 16 and pressure responsive outlet valve means 17 and 18, respectively.

Also illustrated in the plan view of FIG. 1 are combustion means including combustion cylinders 19 and 20 preferably operated on a modified diesel cycle with suitable fuel injection means provided by a fuel pump 21. It will be noted that the combustion cylinders 19 and 20 are connected through suitable conduits to receive high-pressure outlet air from the outlet valve means 17 and 18 respectively. Exhaust from the combustion cylinders 19 and 20 scavenged by the high-pressure inlet air passes through an outlet conduit 22 and constitutes high-pressure hot gas for driving a turbine 23. The turbine 23 itself may be of the conventional type preferably of at least two stages.

Figure 2:
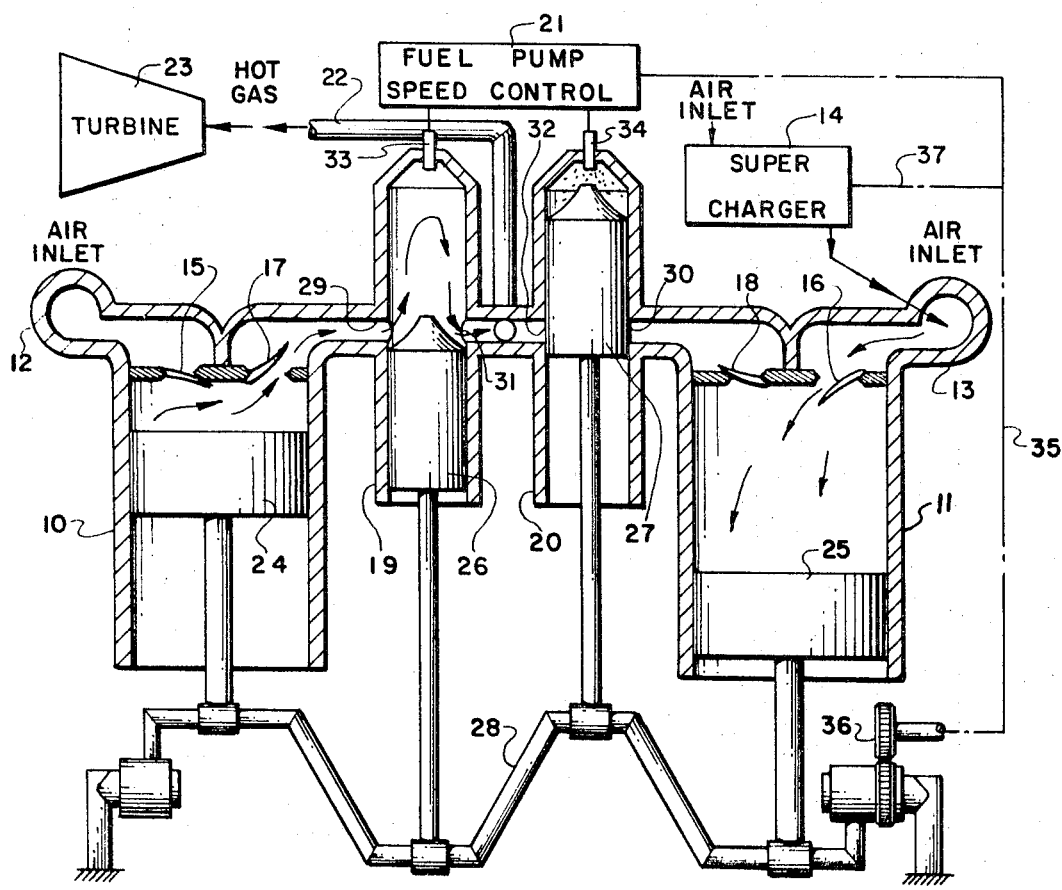
FIG. 2 is a highly diagrammatic side view partly broken away of the system shown in FIG. 1.

Further details of the system of FIG. 1 will be evident from FIG. 2. As shown, the air compressor cylinders 10 and 11 respectively include air pistons 24 and 25. The combustion cylinders 19 and 20 in turn include combustion pistons 26 and 27. All of these pistons are connected through piston rods to a common crankshaft 28. The arrangement is such that the air piston 24 and combustion piston 26 are mechanically locked to always operate 180° out of phase by the crankshaft 28. Similarly, air piston 25 and combustion piston 27 are connected with the crankshaft 28 for 180° out of phase operation. It should be understood that no appreciable external power is derived from the crankshaft 28 itself. This crankshaft is merely an interconnecting means between the combustion engine portion and the constant displacement air compressor portion the operation being substantially balanced so that substantially all of the power generated by the combustion engine is used to drive the air compressor.

The combustion cylinders 19 and 20 in FIG. 2 are provided with air inlets 29 and 30 and gas outlets 31 and 32 respectively. The combustion pistons 26 and 27 are sufficiently elongated as to eclipse these inlet and outlet openings when in their compressed positions and to free these openings for communication with each other when the combustion pistons are in their expanded positions. The high-pressure hot gas outlet line 22 connects to the outlets 31 and 32 as shown in FIG. 2, the line 22 providing hot gas for the turbine 23 as described in FIG. 1.

The combustion cylinders are operated on the diesel cycle principle and towards this end there are provided suitable fuel injectors 33 and 34 at the cylinder heads as shown. These fuel injectors are connected to the fuel pump 21 and will inject fuel into the respective cylinders when the combustion pistons are in their compressed or up position. The small power for operating the fuel pump is provided as indicated schematically by the dashed-dot line 35 and the gear 36 from the crankshaft 28. In this respect, the supercharger 14 described in FIG. 1 may also be operated from the crankshaft as indicated by the dashed line 37. The pressure increase to air supply derived from the supercharger is small in comparison to the total pressure ratio of the system so that the amount of power to operate the fuel pump and supercharger is relatively small and substantially all of the power generated by the combustion means, as described, is utilized in driving the constant displacement air compressor.

OPERATION OF THE EMBODIMENT OF FIGS. 1 AND 2

In operation, consider first the combustion piston 27 in FIG. 2 wherein it is in its compressed state, fuel having been injected by the fuel injector 34 at this point. Because of the high compression of the gases, ignition takes place upon injection of the fuel in accord with the principles of a diesel cycle thereby driving the combustion piston 27 downwardly. It will be noted in the up position of this piston that the outlet 32 and air inlet 30 are blocked by the piston so that a large force is applied to the piston head in driving the same downwardly.

At the point of ignition of the compressed air and gases above the piston head 27, the combustion piston 26 is in its expanded or down position and compressed air from the cylinder 10 under high-pressure will open the air responsive outlet valve means 17 so that air will pass into the combustion cylinder 19 as indicated by the arrows through the air inlet 29. This air will scavenge combusted gases directly out the outlet 31 to the hot gas line 22.

As the combustion piston 27 is driven downwardly, the combustion piston 26 will be driven upwardly and simultaneously, the air compressor piston 24 will be moved downwardly thereby drawing in air from the air inlet through the pressure responsive inlet valve 15. As the combustion piston 26 moves upwardly, it eclipses the air inlet 29 so that downward movement of the air piston 24 results in the air responsive outlet valve 17 closing and the inlet valve 15 opening as a consequence of the pressure differences developed. The upward movement of the combustion piston 26 will simultaneously eclipse outlet 31 wherein further upward movement results in very high compression of the trapped air so that when fuel is injected by the injector 33, combustion will take place to expand against the top of the piston head and drive it downwardly.

In the meantime, gas drawn into the other air compressor cylinder 11 as indicated by the arrows when the combustion piston 27 was on its upstroke will now be compressed by the air compressor piston 25 as the piston 27 moves towards its expanded position. When it reaches its expanded position, the air inlet 30 to the combustion cylinder 20 will be opened thereby permitting compressed gases in the air compressor cylinder 11 to scavenge the burnt gases within the combustion cylinder 20 out the outlet to the hot gas line 22. In other words, at this point in operation, the pistons 27 and 25 will be in the reverse position shown; that is, corresponding to the shown position of the pistons 26 and 24.

The foregoing described cycle will simply repeat with the result that very high-pressure gases are provided on the outlet line 22 to the turbine 23. By utilizing constant displacement air compressor pistons and cylinders in conjunction with the diesel cycle combustion cylinders as described, the provision of self-sustained operation of the gas generator is independent of the speed and thus a wide speed modulation is possible. The output of the gas generator is a variable supply of high-pressure gases fed to the power turbine. Thus, the power output of the turbine is scheduled according to gas generator output and the advantages of idling inherent in conventional gasoline engines can be realized economically.

DETAILED DESCRIPTION OF THE EMBODIMENT OF FIGS. 3 AND 4

In the partial cross section end view of the embodiment of FIG. 3, there is shown an inlet air chamber 38 surrounded by a cowling 39. The ends of four air compressor cylinders arranged in pairs diametrically positioned on either side of a central axis are shown at 40, 41 and 42, 43 respectively. These ends of the cylinders are provided with air pressure responsive inlet valves such as indicated at 44 and 45 for the cylinders 40 and 41. The piston rods for the pistons associated with the cylinders are coupled to a spider 46 having a journal receiving a tilted bearing 47 on a central shaft 48. The spider 46, tilted bearing 47, and shaft 48 constitute an interconnecting means between the various air compressor cylinders performing a synchronizing function similar to that of the crankshaft in the embodiment of FIGS. 1 and 2.

In the diagrammatic showing of FIG. 3 there is illustrated an outlet high-pressure gas line 49 for feeding hot gases from the system to a turbine.

Referring specifically to FIG. 4, the turbine connecting to line 49 is illustrated at 50. A turbine exhaust line 50' exhausts towards the rear of the cowling 39. In this side view of FIG. 4, it will be evident that the system of FIG. 3 includes additional air compressor cylinders in opposed relationship to the cylinders illustrated in FIG. 3. Thus opposed to the air compressor cylinder 40 is a further air compressor cylinder 51. Similarly, the other air compressor cylinders are provided with opposing air compressor cylinders. Since the pairs of opposed cylinders are identical, a detailed description of the air compressor cylinders 40 and 51 and their associated combustion cylinders will suffice for description of all of the radial units depicted schematically in FIG. 3.

The air compressor cylinders 40 and 51 include air pistons 52 and 53 directly interconnected by hollow rods with combustion pistons 54 and 55 respectively. These latter pistons operate in combustion cylinders 40' and 51' of reduced diameter axially aligned with and forming extensions of the air compressor cylinders 40 and 51. Air outlet means for the air compressor cylinders 40 and 51 take the form of internal passages 56 and 57 formed in the air pistons 52 and 53 and associated connecting rods to the combustion pistons 54 and 55. These air passages terminate at the sides of the combustion pistons in outlets 56a and 57a. The other ends of the passages communicate with pressure responsive outlet valves 56b and 57b in the air pistons 52 and 53 respectively. High-pressure hot gas outlets for the combustion cylinders are shown at 58 and 59, these outlets communicating with the high-pressure gas line 49 for passing high-pressure hot gas to the turbine 50.

The cylinder portions 40' and 51' include fuel injectors 60 and 61 connected to a fuel pump 62 which may be driven from the central shaft 48 as indicated at 63. It should be understood that the spider 46 itself does not rotate but will be caused to wobble upon rotation of the tilted bearing 47 for the shaft 48. In this respect, a starter may be provided as shown. The wobbling of the spider mechanically interlocks the opposed piston rods for the air compressors on either side of the central axis for the shaft 48 so that they operate 180° out of phase.

Rotation of the turbine 50 may be utilized to drive an air supercharger as indicated by the dashed line 64. This supercharger may constitute a fan 65 passing air between the walls of the air chamber 38 and cowling 39 into air inlet scoops as shown by the arrows. As in the case of the embodiments of FIGS. 1 and 2, no power for external use is taken from the shaft 48 except for that inappreciable amount of power necessary to operate the fuel pump. Thus, there is again provided a balanced system wherein substantially all of the power generated by the combustion portion of the system is utilized to drive the air compressors.

OPERATION OF THE EMBODIMENTS OF FIGS. 3 AND 4

In operation, and with particular reference to FIG. 4, consider the motion of the combustion piston 55 in moving to the left to its compressed position. This action moves the air piston 53 to the left thereby drawing in air from the air supercharger through the air pressure responsive inlet valves as indicated by the arrows. The piston valves 57b will be closed during the movement. When the piston 55 reaches its maximum compressed condition, fuel will be injected by the fuel injector 61 and ignite to thereby drive the combustion piston 55 to the right as viewed in FIG. 4. This action will then cause the drawn-in air in the air compressor cylinder 51 to be compressed by the air piston 53, the outlet 57a of the air passage 57 into the combustion cylinder being blocked by the wall of the combustion cylinder.

It will also be noted that as the air piston 53 and combustion piston 55 move to the compressed position illustrated in FIG. 4, the air piston 52 and axially aligned combustion piston 54 will be moved to the left as viewed in FIG. 4 thereby resulting in previously compressed gas in the air compressor cylinder 40 passing through the valve 56b into the air passage 56 and into the combustion cylinder all as indicated by the arrows to scavenge previously burnt gases and supercharge this cylinder. The scavenged gases pass through the outlet 58 to the high-pressure gas line 49 as also indicated by the arrows.

When the combustion piston 55 is now moved to the right because of the ignited gases by the injection of fuel by the injector 61, the air piston 52 and combustion piston 54 in the opposed cylinders will move to the right thereby eclipsing the outlet 58 and closing off the air passage outlet 56a. High compression will then take place and ignition by the fuel injector 60 will occur.

In the meantime, movement of the opposed air piston 53 to the right as viewed in FIG. 4 will compress the air drawn into this cylinder and flow through the air passage 57 will be blocked until such time as the outlet 57a of this passage is opposed the egress means in the combustion cylinder 50' for the combustion piston 55.

When the air piston 53 and combustion piston 55 reach their right-hand positions as viewed in FIG. 4, they will be in the positions of the air piston 52 and combustion piston 54 in the opposed cylinders and scavenging air which has been compressed by the piston 53 will pass through valve 57b and passage 57 to scavenge the burnt gases forward of the head of the combustion piston 55 through the outlet 59 to the high-pressure gas line 49. The reciprocating cycle is simply repeated, the opposed aligned air compressor pistons and combustion pistons operating 180° out of phase as a consequence of the spider structure 46.

The operation of the diametrically opposite opposed air pistons and combustion pistons in the lower portion of the drawing of FIG. 4 is identical but will be 180° out of phase with the operation of the upper opposed pistons.

Similarly, the opposed piston arrangements cooperating with the air compressor cylinders 42 and 43 described in FIG. 3 and circumferentially displaced 90° from the structure shown in FIG. 4 will operate 180° out of phase as a consequence of the wobble of the spider 46. However, these pistons will be 90° out of phase with the described pistons associated with the air compressors 40 and 41.

The generated high-pressure gases in the line 49 will drive the turbine 50 which in turn will drive the supercharging fan 65, part of the airflow from the fan being received in the inlet air scoops for the chamber 38.

Essentially the structure of the embodiments of FIGS. 3 and 4 comprises a very compact configuration for multicylinder combustion engine turbine combinations and is ideally suited for aircraft engines of the turbofan and turboshaft types.

As mentioned heretofore, by utilizing substantially all of the power generated by the diesel cycle combustion means for operating the air compressor, extremely high-pressure gases are provided for the turbine and effective turbine cycle pressure ratios in excess of 100 to 1 can be realized in a very compact and lightweight configuration. As a consequence, the turbine, or turboshaft engine in the smaller sizes, will provide performance far superior to any engine presently in service. Moreover, and as also mentioned heretofore, utilizing excess scavenging inlet air to the combustion cylinders and burning with a relatively lean fuel-air mixture assures very complete combustion of the fuel to the end that unburned gases are avoided and substantially clean operation results. As a consequence, smog-forming ingredients are minimized.

While valving arrangements and the like in the embodiments described have been shown only diagrammatically, it should be understood that various types of lift valves and flap valves well known in the art would be utilized. Further, it should be understood that while only certain numbers of air compressor and combustion cylinders and associated pistons have been shown in each of the embodiments, a greater number could be provided connected to the same crankshaft in the embodiment of FIGS. 1 and 2 or to additional arms on the central spider structure in the embodiment of FIGS. 3 and 4. Alternatively, for very simple operations, only one air compressor and one combustion cylinder need be provided.

While cooling techniques have not been described specifically, either water or air cooling may be used. In the embodiment of FIGS. 3 and 4, air cooling is inherent when used on aircraft.

The invention accordingly is not to be thought of as restricted to the particular embodiments set forth merely for illustrative purposes.

I claim:

1. A high-pressure hot gas generator and turbine combination comprising:

a. air compressor means including an air cylinder and air piston;
   b. combustion means including a combustion cylinder and combustion piston, said air cylinder and combustion cylinder being coaxially aligned along a given axis;
   c. interconnecting means including a common rod securing said air piston and combustion piston together for simultaneous movement along said given axis, said air piston moving in a direction to compress air in said air cylinder when said combustion piston is moving under pressure of combusting gases towards its expanded position;
   d. diesel-type fuel injection means for said combustion means, ignition taking place upon complete compression of injected fuel and air when said combustion piston is in its compressed position, said diesel-type fuel injection means including a fuel pump coupled for operation to said interconnecting means;
   e. air pressure responsive inlet and outlet valve means in said air compressor means;
   f. air inlet and gas outlet means in said combustion means, said air pressure responsive outlet valve means in said air compressor means communicating with said air inlet means in said combustion means, and said outlet means in said combustion means being open, when said combustion piston is moved to its expanded position; and said air pressure responsive outlet valve means being blocked from communication with said air inlet means, and said outlet means being blocked when said combustion piston is moved to its compressed position, whereby hot combustion gases are scavenged through said outlet means when said combustion piston is in its expanded position, said hot combustion gases being under high pressure;
   g. a turbine connected to receive said hot combustion gases;
   h. a turbofan driven by said turbine; and i. a cowling surrounding said turbofan, turbine, air compressor means and combustion means to guide airflow from said turbofan over said combustion means and at least partially into air receiving means for said air inlet means thereby providing a turbofan-type engine, in which effective turbine cycle pressure ratios in excess of 100 to 1 can be realized, said air compressor means including at least four air cylinders and four air pistons and said combustion means including at least four combustion cylinders and four combustion pistons, two of said air pistons and associated axially aligned combustion pistons being in opposed relationship along said given axis and two others of said air pistons and associated axially aligned combustion pistons being in opposed relationship along an axis parallel to and laterally spaced from said given axis; said intercoupling means further including a shaft axially positioned between and parallel to said given axis and said axis laterally spaced from said given axis, said shaft having a tilted bearing; and a wobble spider having a journal bearing receiving said tilted bearing and having at least two opposite laterally extending arms coupled to opposed pistons such that wobbling of said spider interlocks motion of said opposed pistons so that movement of said first mentioned opposed pistons is 180° out of phase with movement of said other two opposed pistons.

2. The subject matter of claim 1 in which said turbine is axially aligned with said shaft.